United States Patent
Pugh

(10) Patent No.: US 10,809,656 B1
(45) Date of Patent: Oct. 20, 2020

(54) SYSTEMS AND METHODS OF AUGMENTING DISPLAYS USING SMART LIGHTING MODULES

(71) Applicant: KYOCERA Document Solutions Inc., Osaka (JP)

(72) Inventor: Eric Pugh, Torrance, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 16/368,463

(22) Filed: Mar. 28, 2019

(51) Int. Cl.
| | |
|---|---|
| G03G 15/00 | (2006.01) |
| B41J 2/45 | (2006.01) |
| G06F 3/12 | (2006.01) |
| H04N 1/32 | (2006.01) |
| G06K 15/00 | (2006.01) |
| B41J 11/00 | (2006.01) |

(52) U.S. Cl.
CPC ............... *G03G 15/70* (2013.01); *B41J 2/45* (2013.01); *B41J 11/006* (2013.01); *G03G 15/502* (2013.01); *G03G 15/60* (2013.01); *G06F 3/121* (2013.01); *G06K 15/4085* (2013.01); *H04N 1/3263* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,455,681 | A * | 10/1995 | Ng | G06K 15/1266 |
| | | | | 345/428 |
| 7,969,102 | B2 * | 6/2011 | Chang | H05B 47/19 |
| | | | | 315/318 |
| 8,492,983 | B1 * | 7/2013 | Berg | H05B 45/00 |
| | | | | 315/185 R |
| 8,690,061 | B2 * | 4/2014 | Hall, Jr. | H04N 1/00002 |
| | | | | 235/454 |
| 8,860,750 | B2 * | 10/2014 | Tripathi | G09G 3/2037 |
| | | | | 345/581 |
| 9,188,946 | B2 * | 11/2015 | Nishikawa | H05K 5/0247 |
| 2004/0213590 | A1 * | 10/2004 | Schroath | G03G 15/70 |
| | | | | 399/21 |
| 2014/0146342 | A1 * | 5/2014 | Ishii | G06K 15/4085 |
| | | | | 358/1.14 |
| 2017/0048403 | A1 * | 2/2017 | Baba | H04N 1/00127 |
| 2018/0239583 | A1 * | 8/2018 | Castells De Monet | |
| | | | | G06F 3/1204 |

\* cited by examiner

*Primary Examiner* — Paul F Payer
(74) *Attorney, Agent, or Firm* — L/O of Alexis J Saenz

(57) ABSTRACT

A system, method, and apparatus provide an improvement to user guided operation or troubleshooting of a device by illuminating an area of the device for the user's attention. Embodiments may include a plurality of lights. Each light is positioned respectively in a predetermined location in the printing apparatus, which may comprise known locations for paper jams to occur. Embodiments may also include a voice recognition module and a controller module connected to the plurality of lights. The controller module may be configured to: receive, from the voice recognition module, a user generated message requesting identification of the location of the paper jam; identify which of the predetermined locations has the paper jam; and activate a selected one of the plurality of lights, wherein the selected one of the plurality of lights is positioned to illuminate the predetermined location with the paper jam.

16 Claims, 7 Drawing Sheets

SYSTEMS AND METHODS OF AUGMENTING DISPLAYS USING SMART LIGHTING MODULES

CROSS-REFERENCE TO RELATED APPLICATION

None.

FIELD

The subject disclosure relates to device troubleshooting and more particularly to systems and methods of augmenting displays using smart lighting modules.

BACKGROUND

Current devices generally use printed manuals to guide users in device operation and troubleshooting. Some devices use static imagery in an attempt to point out a device part or location.

SUMMARY

In one aspect of the disclosure, a system for identifying a location of a paper jam in a printing apparatus is disclosed. The system comprises a plurality of lights. Each light is positioned respectively in one of a number of predetermined locations in the printing apparatus, wherein the predetermined locations comprise known locations for paper jams to occur. The system also comprises a voice recognition module and a controller module connected to the plurality of lights and to the voice recognition module. The controller module is configured to: receive, from the voice recognition module, a user generated message requesting identification of the location of the paper jam; identify which of the predetermined locations has the paper jam; and activate a selected one of the plurality of lights, wherein the selected one of the plurality of lights is positioned to illuminate the predetermined location with the paper jam.

In another aspect, a printing apparatus is disclosed. The printing apparatus comprises a print path defined by a plurality of mechanical elements; a tray configured to provide a sheet of paper into the print path; a plurality of lights, wherein each light is positioned respectively in one of a number of predetermined locations in the printing apparatus, wherein the predetermined locations comprise known locations along the print path for a paper jam to occur; a voice recognition module; and a controller module connected to the plurality of lights and to the voice recognition module. The controller module is configured to: receive, from the voice recognition module, a user generated message requesting identification of the location of the paper jam; identify which of the predetermined locations has the paper jam; and activate a selected one of the plurality of lights, wherein the selected one of the plurality of lights is positioned to illuminate the predetermined location with the paper jam.

In yet another aspect, a method of identifying a location of a paper jam in a printing apparatus is disclosed. The method comprises: receiving, from a voice recognition module, a user generated message requesting identification of the location of the paper jam; identifying which of a number of predetermined locations in the printing apparatus has the paper jam; and activating a selected one of a plurality of lights, wherein the selected one of the plurality of lights is positioned to illuminate the predetermined location with the paper jam.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1:
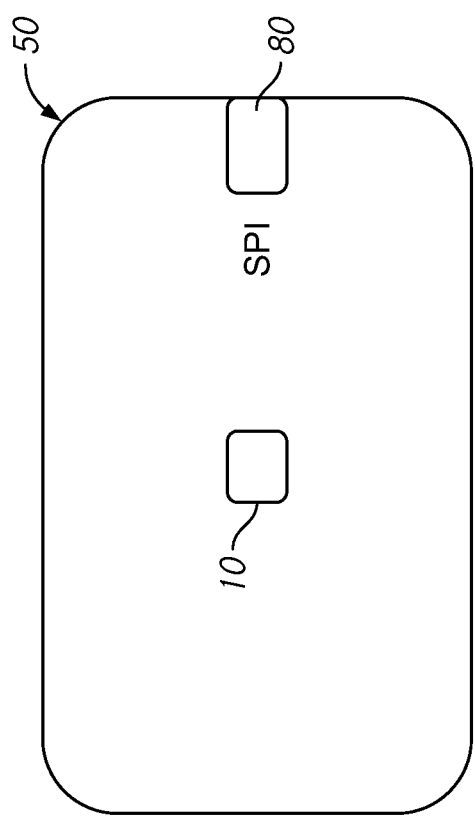
FIG. 1 is a diagrammatic view of a smart display controller in accordance with an embodiment of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

As will be appreciated, embodiments disclosed below may be practiced in and have industrial applicability to the general fields of device operation and in some applications, to guided device troubleshooting.

Devices may often be difficult for users to generally operate or fix when a problem occurs. Product displays do not always have a rich interface capability due to display limitations, costs, and design limitations. Complicated products, for example, printers, may not have enough detail in the display panel to sufficiently pinpoint the part causing the problem in the printer. For example, some displays will provide an instruction such as "Look at area 5", or simply provide an image of the printer internal parts which may not be enough information for the user.

Some household products, such as microwave ovens, may have a confusing display panel, or have a display panel that is difficult to see if the product is located up high, or have a complex sequence of steps for a given operation. The user may not understand what buttons should be pressed if they are unfamiliar with the device's controls or settings and the operation panel is not labeled intuitively or is otherwise, user unfriendly.

As can be seen, there is a need to improve on the guidance provided to operate a device for users.

Generally, embodiments of the disclosure below include a smart lighting module that can be leveraged for a variety of applications that illuminate for a user, some element of a device to guide the user in the device's operation. Embodiments may be an aftermarket product connected to the device or may be integrated as part of an original larger system. Embodiments include addressable lights (for example, light emitting diodes (LEDs)), which may be positioned in predetermined locations of the device. Depending on the application, the user may be guided by illuminating one or more of the addressable lights sequentially so that the user may be visually directed to a point(s) or a particular sequence of steps on the device. Exemplary embodiments may include a voice recognition module connected to the smart lighting module. The voice recognition module may be configured to receive a verbal command by the user and illuminate the addressable light(s) based on the result of the voice command. Receipt of a query through the voice recognition module may trigger identification of a location on the device. For example, the voice recognition module may identify key words in a command such as "show me where the error is", which may trigger a lookup in an electronic table that equates the command to a function. In an exemplary embodiment, the request to show the location of an error may illuminate an addressable light at the location in the device where the error occurred. Some embodiments include a series or sequence of addressable lights illuminated to lead the user to an end location. The system may assist the user in operating the device by showing for example, buttons and/or device elements that need to be operated in an order shown by the illuminated lights. Other embodiments help troubleshoot a device by leading the user to a source of error.

Figure 2:
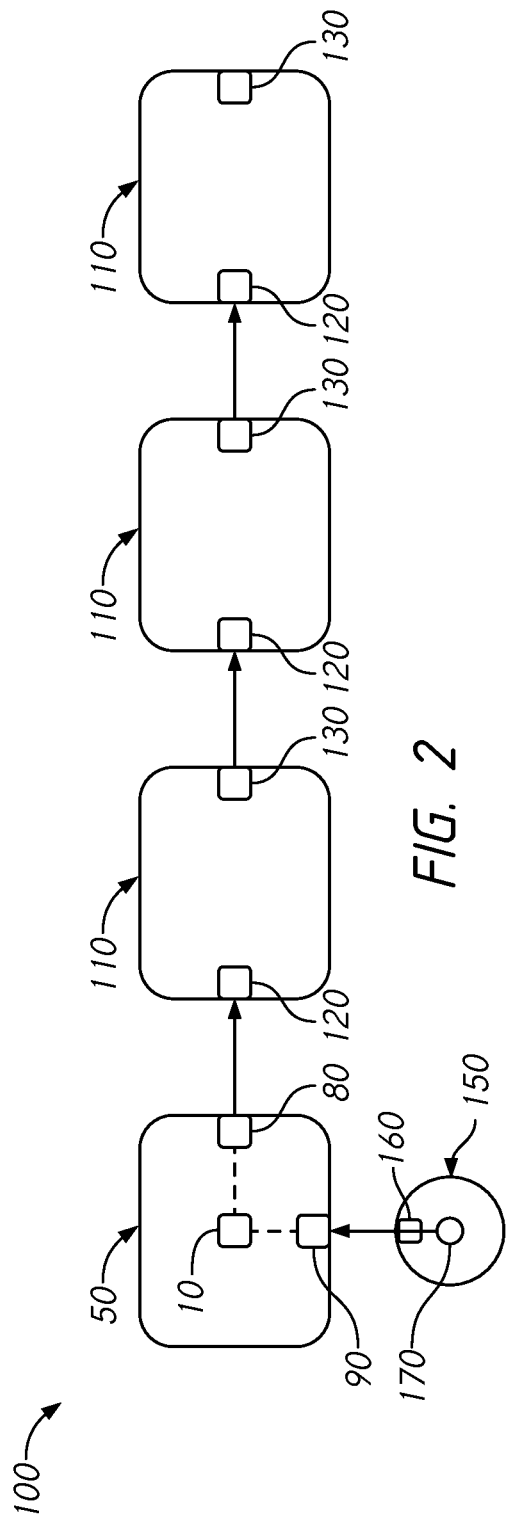
FIG. 2 is a block diagram of a smart lighting module system in accordance with an embodiment of the subject technology.
Figure 3:
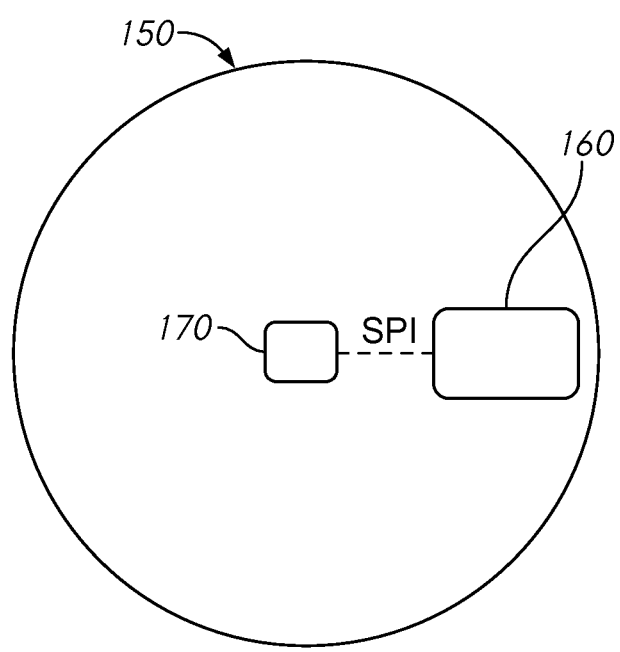
FIG. 3 is a diagrammatic view of a voice recognition module in accordance with an embodiment of the subject technology.

FIG. 1 and FIG. 2 show a smart controller module 50 according to an exemplary embodiment. FIG. 1 shows the smart controller module 50 on its own, while FIG. 2 shows the smart controller module 50 as part of a system embodiment. The smart controller module 50 may be a computing device that includes a processor 10 (for example, a central processing unit (CPU)), which may communicate with other elements of a smart lighting module system 100 (sometimes referred to in general as the "system 100") through, for example, a serial peripheral interface (SPI) port 80. The system 100 includes one or more addressable lights 110. In an exemplary embodiment, the addressable lights 110 may be LED based lights. The addressable lights 110 may include a data input port 120 and a data output port 130. In an exemplary embodiment, the addressable lights 110 may be serially connected (either wired or wirelessly) to the smart controller module 50 (via SPI port 80 configured as an output port) to form a string of addressable lights. Referring also now to FIG. 3, some embodiments include a voice recognition module 150. In some embodiments, the voice recognition module 150 is integrated into the system 100. In some embodiments, the voice recognition module 150 is an auxiliary element connected to the smart controller module 50 (for example, a smart hub device that has been programmed to communicate with the smart controller module 50). An output port 160 may be connected to an input port 90 of the smart controller module 50. It will be understood that the voice recognition module 150 may be any electronic circuit which identifies verbal commands issued by a user and processes those commands, for example, by a processing unit 170 built into the voice recognition module 150 circuit (not shown).

Figure 4:
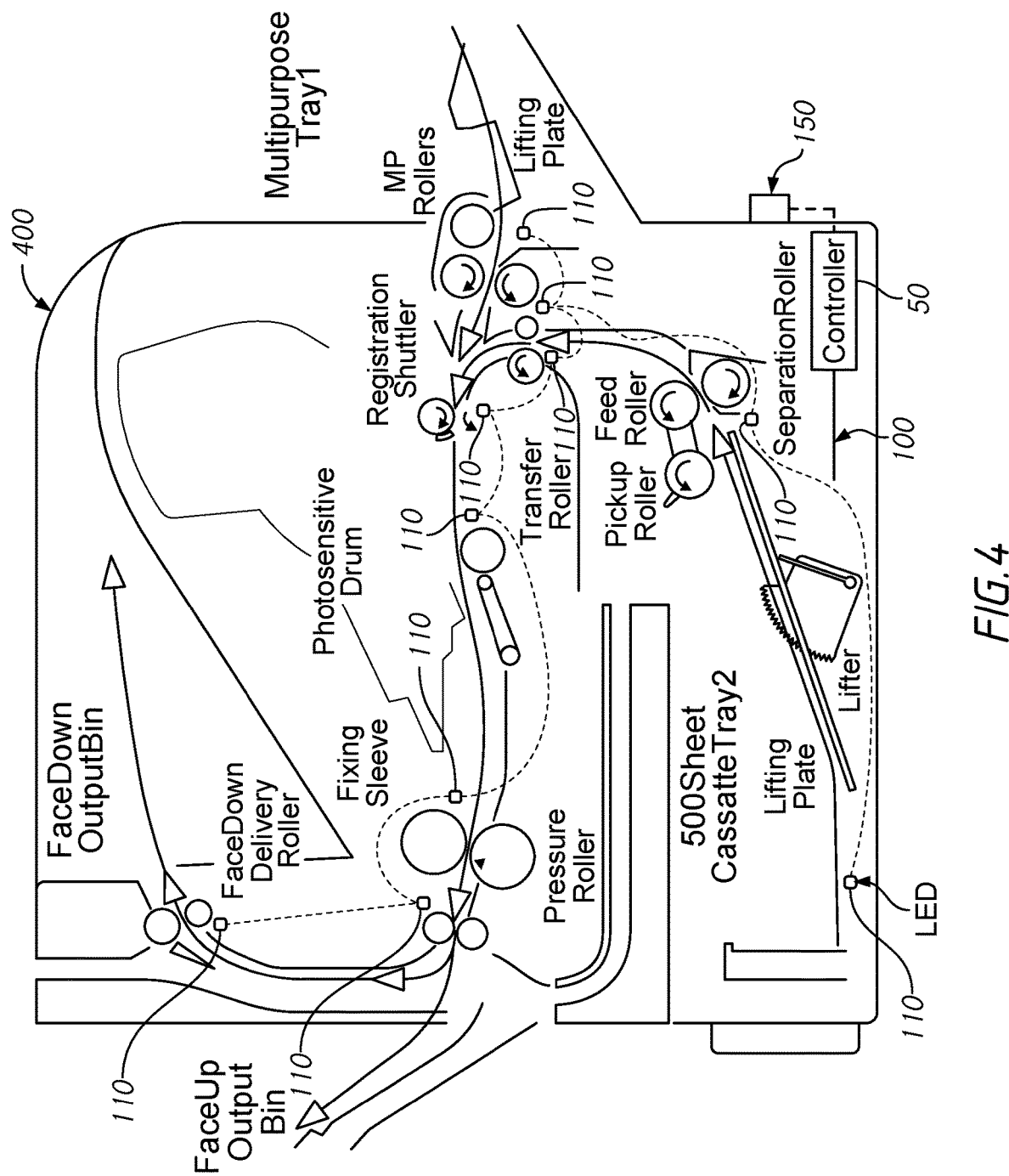
FIG. 4 is a diagrammatic, internal view of an apparatus including a smart lighting module system in accordance with embodiments of the subject technology.

In operation, embodiments may position each addressable light 110 in one of a number of predetermined locations in a device. Examples of predetermined locations along the print path of paper in a printing apparatus are shown in FIG. 4 below. The processor 10 (or a memory element connected to the processor 10), may store the addresses of each addressable light 110 along with its associated position in the device. It will be understood that "addressable" refers to an electronic device which may include an electronic identity accessible by electronic communications. Some embodiments, for example, may augment an electronic display so that the addressable lights 110 are positioned proximate buttons on the display. Device firmware uses for example, a "problem query" that is automatically triggered by machine processes (for example, in the case of an operating error) or by a user trigger. The query may yield a "display coordinate, or coordinates" for directing the user's attention to a location on the device. The coordinates may be values associated with the location of addressable lights 110 in the device. These coordinates may be provided to the smart controller module 50. The smart controller module 50 may in one embodiment, convert the "display coordinates" to the position of an addressable light 110. The smart controller module 50 sends a signal to illuminate the addressable light 110.

A person may be guided to operate the device by virtue of the system 100 illuminating the addressable lights 110. For example, in an electronic operation panel, embodiments may illuminate the area proximate a button(s) to be pushed. For example, some electronic appliances may be augmented by incorporating the system 100. A user may issue a verbal command which is registered by the voice recognition module 150. The voice recognition module 150 may send a message to the smart controller module 50 requesting illumination of a selected button(s)/location(s) on the appliance for the user to visually identify. The smart controller module 50 may identify the locations on the device that need illumination and may retrieve the address of the addressable light(s) 110 associated with the location(s). The smart controller 50 may then send a message to the address of the addressable light(s) 110 associated with the location(s) triggering illumination for the user to see the location, or for example, a button to press. User input at each step would signal to the smart controller 50 to move on to the next step in the sequence. For example, the smart controller 50 may illuminate the addressable light 110 proximate or associated with a first button. In response to the user triggering the button for the first step, the smart controller 50 may illuminate the addressable light 110 of a button for the next setting or step in the process the user requested. The illumination of addressable lights 110 continues in a sequence until buttons for the desired setting/process are triggered and the end result is achieved.

To illustrate an example application, the system 100 may be incorporated into a microwave oven making the appliance a smart device. The user may wish to know what settings to press to cook a particular food dish. Referring now to FIG. 5A, a method 270 for showing a user a sequence of button presses to cook a selected food dish is shown according to an exemplary embodiment. The user may ask by voice command 275 the microwave oven to show the button sequence required to cook the food dish. The voice recognition module 150 may recognize the request and translate the message into a format understood by the smart controller module 50. The smart controller module 50 may determine the sequence of buttons that needs to be pressed. In the application to a microwave oven, the predetermined locations may be the buttons that need to be pressed (or locations adjacent the buttons). Accordingly, the smart controller module 50 may control the illumination of buttons on the microwave's display based the order of addresses that light up the proper sequence of settings for the user to push. For example, the smart controller module 50 may retrieve the settings for the food dish. A first setting for the food dish may be retrieved. For example, a power level setting may be selected. Accordingly, the smart controller module 50 may illuminate an addressable light 110 proximate the power level setting button on the microwave display panel. The user may press 280 the power level button. In some embodiments, the power level button may need to be pressed multiple times to reach the setting needed. In which case, the smart controller module 50 may re-illuminate the addressable light 110 proximate the power level button until the user presses the power level button enough times to reach the power level setting for the food dish. The smart controller module 50 may then retrieve a second setting and illuminate the addressable light 110 proximate a second button controlling the second setting. The user may press 285 the second button to set the second setting. The user may continue pressing any next buttons 290 illuminated by the smart controller module 50 until the settings are ready for the selected food dish. Typically, the microwave oven is then ready for the user to press the start button to cook the food dish.

Referring now to FIG. 4, another exemplary embodiment is shown that includes operation of an image forming apparatus 400, which in some embodiments may be a printing apparatus. For sake of illustration, the following description may refer to the image forming apparatus 400 as the printing apparatus 400 and the addressable lights 110 as LED units 110. It will be appreciated that the example provided above may also be applied to operating the printing apparatus 400. The smart controller module 50 and the voice recognition module 150 may guide the user through a user interface on an electronic display, on how to perform a certain printing function. For example, the system 100 may illuminate areas of the printing apparatus to guide the user where to load paper, load an ink source, and/or which buttons on a panel to press by illuminating LED units 110 in those areas and proximate the buttons needed to perform the function.

In another exemplary application, the system 100 may be used to troubleshoot a device. Still referring to FIG. 4, for example, the system 100 may be used to guide the user to a source of error, such as a paper jam. FIG. 4 shows a diagrammatic view of print paths in the printing apparatus 400. The print paths generally begin from and pass among (or proximate) various mechanical elements inside the printing apparatus. Mechanical elements may be for example, rollers, plates, trays, cassettes, fusers, drums, feeds, and bins. In an exemplary embodiment, the mechanical elements and transitions between mechanical elements may be predetermined locations where paper jams or other errors may occur. For examples, rollers at various points along the print path may mangle paper, accidently grab multiple sheets of paper, or incorrectly grab paper. Transitions between trays and cassettes to rollers may also be predetermined locations for paper jams since misfeeds may commonly occur between such mechanical elements. A plurality of LED units 110 may be positioned at predetermined points within the printing apparatus 400. In an exemplary embodiment, the LED units 110 may be positioned along one or more print paths, for example, at places proximate to where a paper jam may occur.

Figure 5:
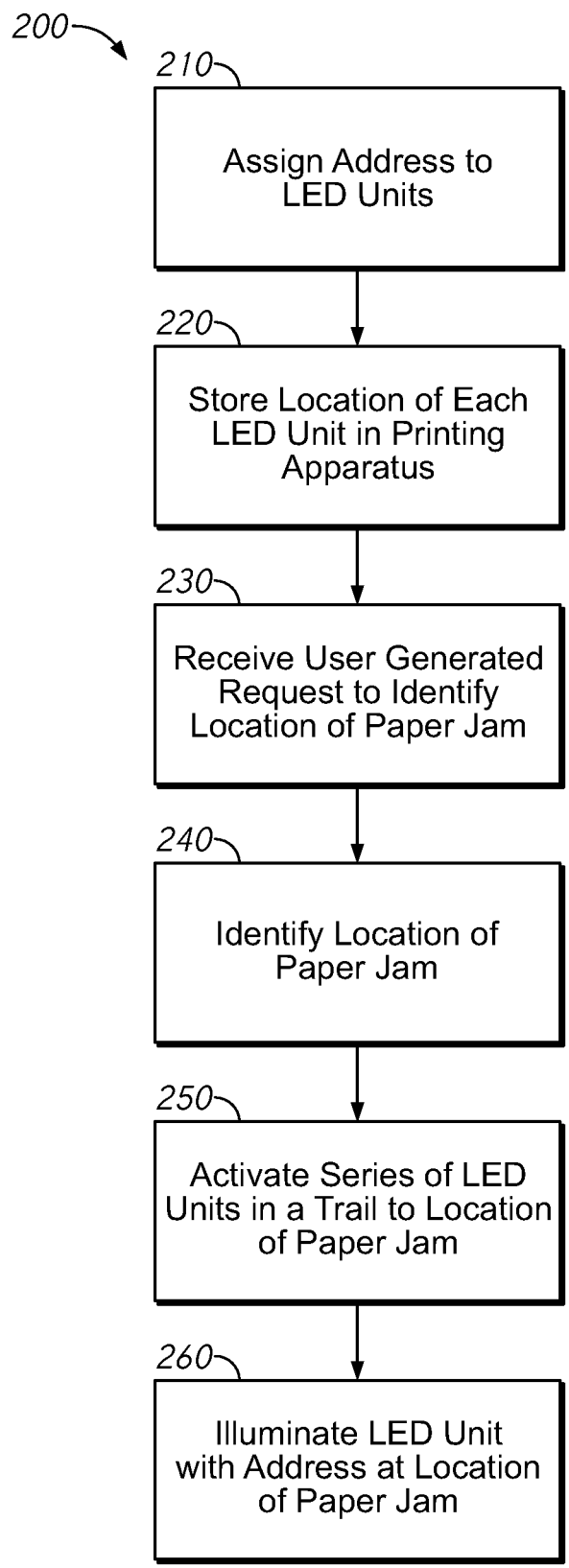
FIG. 5 is a flowchart of a method of identifying a location in an apparatus in accordance with embodiments of the subject technology.
Figure 5A:
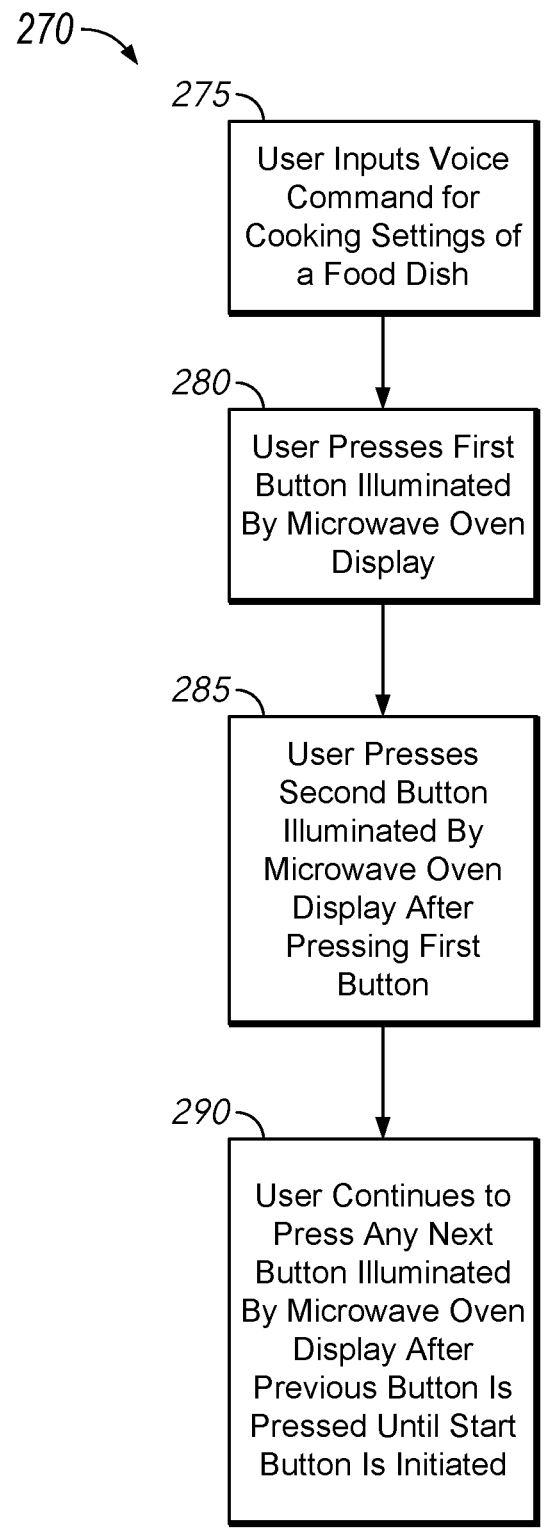
FIG. 5A is a flowchart of a method of user guided inputs in accordance with embodiments of the subject technology.

Referring now to FIG. 5 concurrently with FIG. 4, a method 200 of identifying a location of a paper jam in a printing apparatus is shown according to an exemplary embodiment. The processing unit or controller of the printing apparatus may register an occurrence of a paper jam (or other error) through sensors in the printing apparatus. A user may be guided to the location of the paper jam by illuminating the location according to the address of the LED unit 110 associated with the location. In the smart controller module 50 (or other memory storage connected to the LED units 110), the address of each LED unit 110 may be assigned and stored 210. In addition, the location of each LED unit 110 in the printing apparatus 400 (or other device) may be stored 220. In response to the occurrence of a paper jam, which the user may be alerted to by a display panel alert, the user may request to identify the location of the paper jam. In an exemplary embodiment, the user may make a verbal request which is detected by the voice recognition module 150. The voice recognition module 150 may forward the user generated request to the smart controller module 50 where it is received 230. In other embodiments, the panel display showing the paper jam alert may include a button option that requests identification of the paper jam location which may be manually triggered by the user.

In an exemplary embodiment, the printing apparatus may have predetermined locations stored in memory for where paper jams occur. The printing apparatus may have the LED units 110 pre-mounted proximate to the predetermined locations. The processing unit or controller of the printing apparatus may identify which of the predetermined locations is the site of the paper jam. When sensing a paper jam the printer controller sends the display controller information. The smart controller module 50 may receive from a processing unit of the printing apparatus 400 (for example CPU 410 shown in FIG. 7 below) the location of the paper jam. Once the location of the paper jam is identified 240, the smart controller module 50 may identify the address of the LED unit 110 at the identified location. In some embodiments, the user may be guided to the location by the smart controller module 50 activating 250 a series of LED units 110 in a trail that guide the user to the location. The LED unit 110 with the address associated with the location of the paper jam is illuminated 260 so that the user can identify the jam. In some embodiments, the LED units 110 may for example, be illuminated in a sequence which may repeat until the paper jam is located and removed. When sensing the clearing of the paper jam by the user the printer controller sends the display controller information, such as a clear address signal, which allows the display controller to shut off the display.

Figure 6:
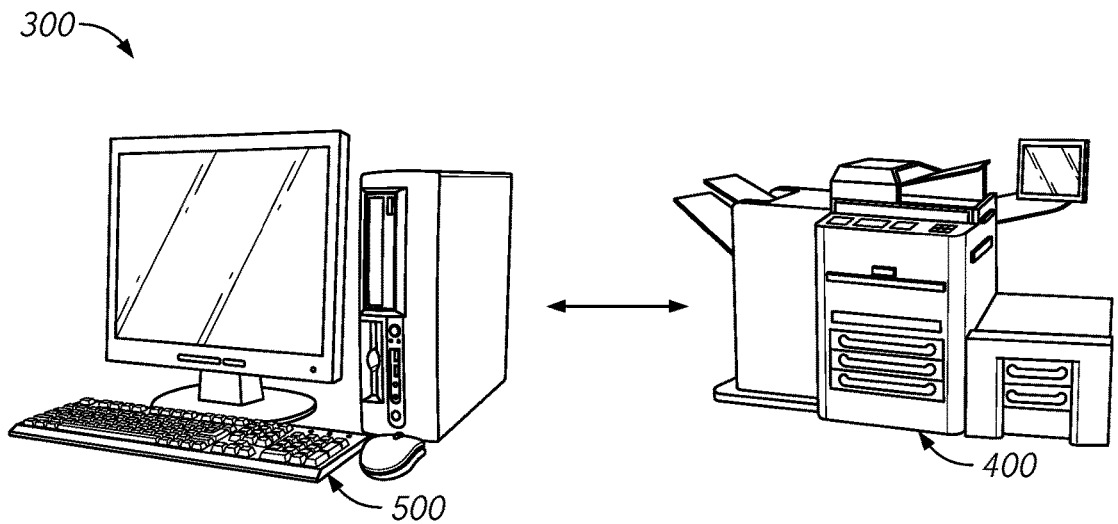
FIG. 6 is a schematic of a print job system in accordance with an embodiment of the subject technology.
Figure 7:
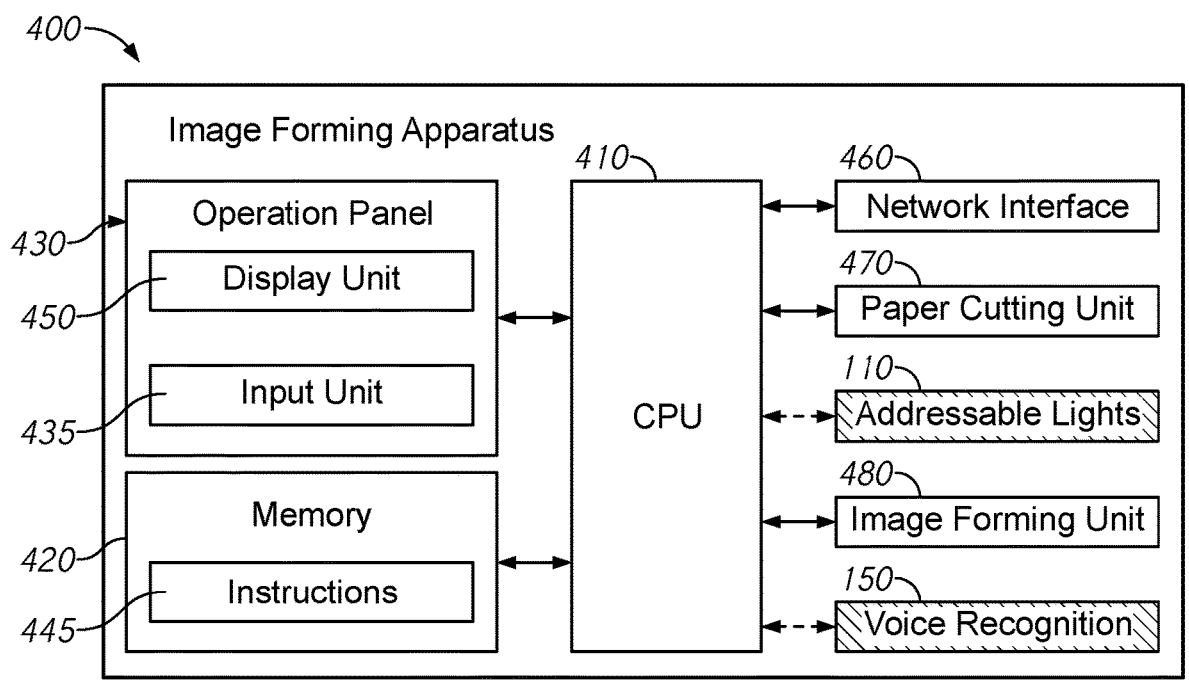
FIG. 7 is a block diagram of an image forming apparatus in accordance with an embodiment of the subject technology.
Figure 8:
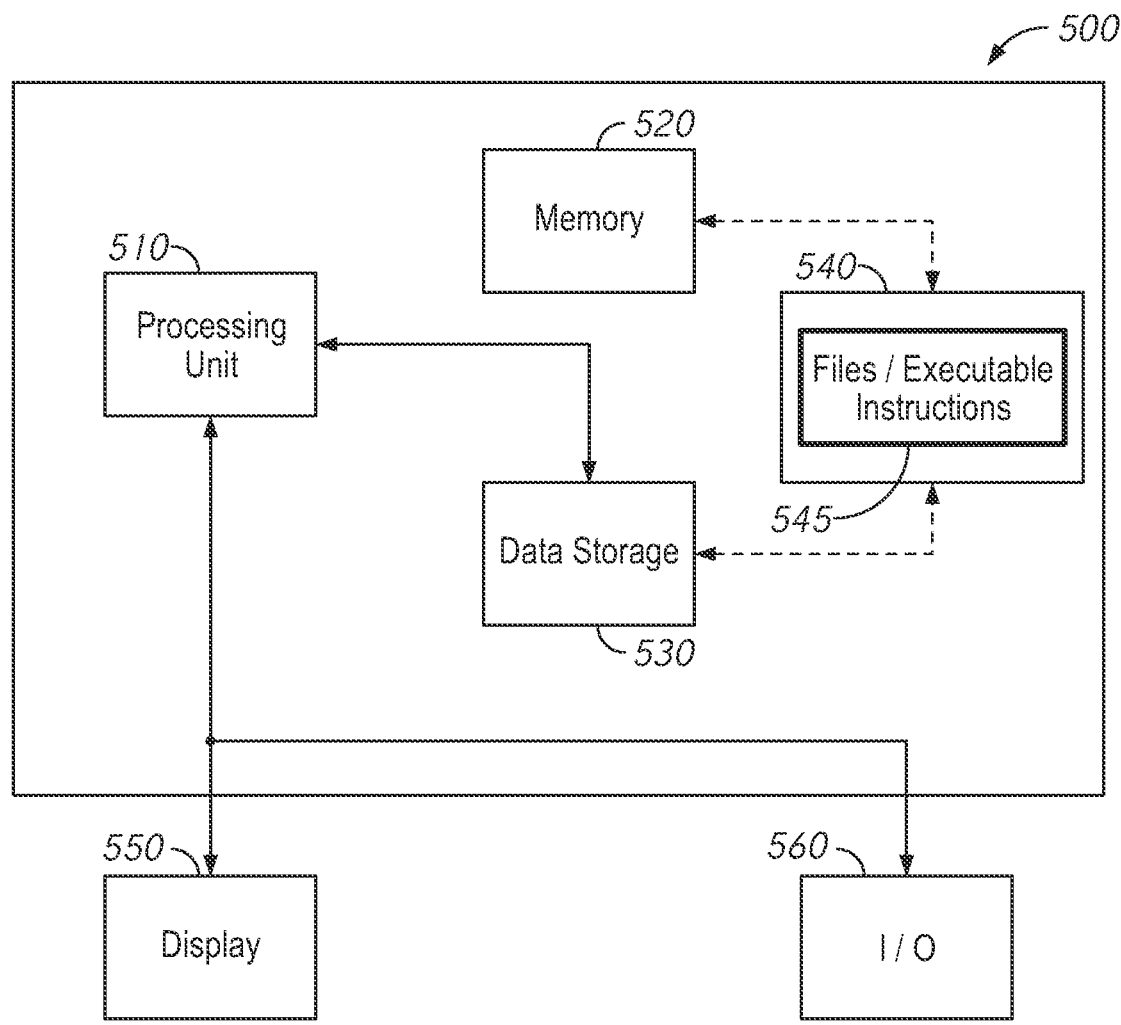
FIG. 8 is a block diagram of a computing device in accordance with an aspect of the subject technology.

Referring now to FIGS. 6-8, a system and machine of the subject technology are shown according to exemplary embodiments. A system 300 is shown in FIG. 6 which may include an image forming apparatus 400 connected to a computing device 500. In some embodiments, the above described process(es) may be loaded as executable instructions into one or both of the image forming apparatus 400 and the computing device 500. For example, a software embodiment loaded into the computing device 500 may alert the user to an error in the apparatus 400 on a user interface at the user's workstation. From the user workstation, the user may trigger the request to identify the error (for example, a paper jam, empty cassette tray, empty ink cartridge, etc.), so that on arrival at the image forming apparatus, the addressable lights 110 visually guide the user to the error source. FIG. 7 shows a schematic example of the image forming apparatus 400. FIG. 8 shows a schematic example of a computing device 500.

The image forming apparatus 400 may be for example, a computing-based image processing and printing device that can receive print job requests (for example, a printer, a fax machine, a copier machine or multi-function device with these functions and more). The components of the image forming apparatus 400, may include, but are not limited to, one or more processors or processing units 410, a system memory 420, an operation panel 430, an input unit 435, a set of program modules 445 including files and executable instructions, a display unit 450, a network interface 460, a paper cutting unit 470, an image forming unit 480, and a bus system that couples various system components including the system memory 420 to the processor(s) 410. The display unit 450 may be a smart display. As a smart display, the display unit 450 may be configured to wirelessly communicate with a computing device, for example, the printer controller (which may include for example, the processing unit 410) of the image forming apparatus 400 or with a remote computing device 500. The system memory 420 may store for example, executable instructions. In some embodiments, instead of having a separate smart module controller 50, the printing apparatus 400 may include the addressable lights 110 and/or the voice recognition module 150 integrated into the apparatus. The addressable lights 110 and the voice recognition module 150 may be connected to the processing unit 410. When an error in the apparatus 400 occurs, identification of the error, the error location, the identification of the addressable light 110 at the location of the error source, and the operation of addressable lights 110 to guide the user to the error source may be performed by the processing unit 410.

The computing device 500 may be for example, a computer system or a computer server. In some embodiments, the image forming apparatus 400 may be another example of a computing device 500. In some embodiments, the computing device 500 may be a host server. In the role of a user device, the computing device 500 is generally not a server but may instead be desktop computers, tablet or laptop computers, all-in-one computer stations, a mobile computing device (for example, a smart phone, smart wearable devices (glasses, jewelry, watches, ear wear, etc.), or programmable electronics.

The components of the computing device 500, may include, but are not limited to, one or more processors or processing units 510, a system memory 520, data storage 530 (sometimes referred to as memory or memory storage), a computer program product 540 having a set of program modules 545 including files and executable instructions, and a bus system that couples various system components including the system memory 520 to the processor(s) 510. The system memory 520 may store for example, electronic files of the image objects to be printed.

The computing device 500 may be described in the general context of computer system executable instructions, such as the program modules 545 which represent a software embodiment of the system and processes described generally above. The program modules 545 generally carry out the functions and/or methodologies of embodiments as described above. The computing device 500 may typically include a variety of computer system readable media. Such media could be chosen from any available media that is accessible by the computing device 500, including non-transitory, volatile and non-volatile media, removable and non-removable media for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. The system memory 520 could include one or more computer system readable media in the form of volatile memory, such as a random-access memory (RAM) and/or a cache memory. The data storage system 530 may read from and write to a non-removable, non-volatile magnetic media device. The system memory 520 may include at least one program product 540 having a set of program modules 545 that are configured to carry out the functions of embodiments disclosed in the form of computer executable instructions. The program product/utility 540, having a set of program modules 545, may be stored in the system memory 520 by way of example, and not limitation, as an operating system, one or more application programs, other program modules, and program data. Some embodiments may generate an electronic user interface (viewable and controllable from the display unit 550 or display 550) that may allow the user to interact with for example, the image forming apparatus 400 and trigger processes that guide the user to a location in the image forming apparatus (or other device) for various purposes including device operation and troubleshooting.

The computing device 500 may communicate with one or more external devices including for example, an electronic display 550 which may in some embodiments be configured for tactile response as in a touch screen display. User input into the display 550 may be registered at the processor 510 and processed accordingly. Other devices may enable the computing device 500 to communicate with one or more other computing devices, either by hardwire or wirelessly. Such communication can occur via Input/Output (I/O) interfaces/ports 560. In some embodiments, the I/O interfaces/ports 560 may be specially configured to handle aspects of the embodiments described herein converting the computing device 500 into a special purpose machine. For example, as a printer, the I/O interfaces/ports 560 may be configured to transmit data related to error source identification and locating the source through use of addressable lights 110. The printer 500 as a standalone computing device (or as connected to the computing device 500) may be dedicated to printing and cutting jobs. The I/O interfaces/ports 560 may also include printing modules (for example, ink jet print heads, laser print systems, etc.) for rendering a physical embodiment of the converted image objects onto a page.

The computing device 500, through the I/O interface/ports 560, may communicate with one or more networks such as a local area network (LAN), a general wide area network (WAN), and/or a public network (e.g., the Internet) via a network adapter as is commonly known in the art. Each of the operating system, one or more application programs, other program modules, and program data or some combination thereof, may include an implementation of a networking environment. In some embodiments, the computing device 500 may be a cloud computing node connected to a cloud computing network (not shown). The computer computing device 500 may be practiced in distributed cloud computing environments where tasks are performed by remote processing devices that are linked through a communications network. In a distributed cloud computing environment, program modules may be located in both local and remote computer system storage media including memory storage devices.

As will be appreciated by one skilled in the art, aspects of the disclosure may be embodied as a system, method or process, or computer program product. Accordingly, aspects of the subject technology may take the form of an entirely hardware embodiment, an entirely software embodiment (including firmware, resident software, micro-code, etc.) or an embodiment combining software and hardware aspects that may all generally be referred to herein as a "module", "circuit", or "system." For example, a "memory module" may in some hardware embodiments be any one of the system memory 420, the system memory 520, the data storage 530 or any combination thereof. Furthermore, aspects of the subject technology may take the form of a computer program product embodied in one or more computer readable media having computer readable program code embodied thereon. In some embodiments, the output of the computer program product provides an electronic user interface on the display 550 which may be controlled via direct contact with the display 550 or via the I/O interfaces 560 (which may be for example, interface devices such as keyboards, touchpads, a mouse, a stylus, or the like).

Aspects of the subject technology are described above with reference to block diagrams of methods, apparatus (systems) and computer program products according to embodiments. It will be understood that each block of the block diagrams, and combinations of blocks in the flowchart illustrations and/or block diagrams, can be implemented by computer program instructions. These computer program instructions may be provided to the processor 510 of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks in the figures.

Those of skill in the art would appreciate that various components and blocks may be arranged differently (e.g., arranged in a different order, or partitioned in a different way) all without departing from the scope of the subject technology. The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

Thus, the claims are not intended to be limited to the aspects shown herein, but are to be accorded the full scope consistent with the language of claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the scope of any embodiment.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A system for identifying a location of a paper jam in a printing apparatus, comprising:
   a plurality of lights, wherein each light is positioned respectively in one of a number of predetermined locations in the printing apparatus, wherein the predetermined locations comprise known locations for paper jams to occur;
   a voice recognition module; and
   a controller module connected to the plurality of lights and to the voice recognition module, wherein the controller module is configured to:
      receive, from the voice recognition module, a user generated message requesting identification of the location of the paper jam;
      identify which of the predetermined locations has the paper jam;
      illuminate a sequence of the plurality of lights in a trail of the predetermined locations visually leading the user to the paper jam, wherein the trail of the predetermined locations is located inside the printing apparatus and wherein the plurality of lights are wirelessly connected in series; and
      repeat illuminating the sequence of the plurality of lights in the trail of the predetermined locations.

2. The system of claim 1, wherein each of the plurality of lights includes an addressable light emitting diode (LED).

3. The system of claim 2, wherein the controller module includes an electronic file including an LED address associated with each predetermined location.

4. The system of claim 1, wherein the controller module is further configured to repeat illumination of the sequence of the plurality of lights in the trail of the predetermined locations visually leading the user to the paper jam until the paper jam is removed.

5. The system of claim 1, further comprising a smart display connected to the voice recognition module and to the controller module, wherein the smart display includes:
- an electronic user interface (UI) including a paper jam indicator; and
- a user selectable option in the UI, triggering an activation of the voice recognition module, wherein a spoken user command is converted into the user generated message requesting identification of the location of the paper jam.

6. A printing apparatus, comprising:
- a print path defined by a plurality of mechanical elements;
- a tray configured to provide a sheet of paper into the print path;
- a plurality of lights, wherein each light is positioned respectively in one of a number of predetermined locations in the printing apparatus, wherein the predetermined locations comprise known locations along the print path for a paper jam to occur;
- a voice recognition module; and
- a controller module connected to the plurality of lights and to the voice recognition module, wherein the controller module is configured to:
  - receive, from the voice recognition module, a user generated message requesting identification of a location of the paper jam;
  - identify which of the predetermined locations corresponds to the location of the paper jam;
  - illuminate a sequence of the plurality of lights in a trail of the predetermined locations visually leading the user to the paper jam, wherein the trail of the predetermined locations is located inside the printing apparatus and wherein the plurality of lights are wirelessly connected in series; and
  - repeat illuminating the sequence of the plurality of lights in the trail of the predetermined locations.

7. The apparatus of claim 6, wherein each of the plurality of lights includes an addressable light emitting diode (LED).

8. The apparatus of claim 7, wherein the controller module includes an electronic file including an LED address associated with each predetermined location.

9. The apparatus of claim 6, wherein the controller module is further configured to the sequence of the plurality of lights in the trail of the predetermined locations visually leading the user to the paper jam until the paper jam is removed.

10. The apparatus of claim 6, further comprising a smart display connected to the voice recognition module and to the controller module, wherein the smart display includes:
- an electronic user interface (UI) including a paper jam indicator; and
- a user selectable option in the UI, triggering an activation of the voice recognition module, wherein a spoken user command is converted into a message requesting identification of the location of the paper jam.

11. A method of identifying a location of a paper jam in a printing apparatus, comprising:
- receiving, from a voice recognition module, a user generated message requesting identification of the location of the paper jam;
- identifying which of a number of predetermined locations in the printing apparatus has the paper jam, wherein the predetermined locations comprise known locations for paper jams to occur;
- illuminating a sequence of a plurality of lights in a trail of the predetermined locations visually leading the user to the paper jam, wherein the trail of the predetermined locations is located inside the printing apparatus and wherein the plurality of lights are wirelessly connected in series; and
- repeating illumination of the sequence of the plurality of lights in the trail of the predetermined locations.

12. The method of claim 11, further comprising associating, in an electronic file, each of the predetermined locations with a respective address and assigning each of the plurality of lights to one of the addresses.

13. The method of claim 12, wherein the plurality of lights comprises addressable light emitting diodes (LEDs).

14. The method of claim 11, wherein the message from the voice recognition module is received from a user activated smart display.

15. The method of claim 11, further comprising repeating illumination of the sequence of the plurality of lights in the trail of the predetermined locations visually leading the user to the paper jam until the paper jam is removed.

16. The method of claim 15, wherein the sequence of the plurality of lights is based on addresses of lights being in series along the printer path.

* * * * *